US012650971B2

(12) United States Patent
Cheah et al.

(10) Patent No.: US 12,650,971 B2
(45) Date of Patent: Jun. 9, 2026

(54) DATA RETENTION MANAGEMENT BASED ON CONSISTENCY OF TABLE GROWTH AND DATA PURGING ACTIVITY

(71) Applicant: Dell Products L.P., Round Rock, TX (US)

(72) Inventors: Beng Kiong Cheah, Bukit Mertajam (MY); Shu Hsien Lee, Air Itam (MY); Lead Ta Choo, Puchong SL (MY)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/940,078

(22) Filed: Nov. 7, 2024

(65) Prior Publication Data

US 2026/0127155 A1 May 7, 2026

(51) Int. Cl.
*G06F 16/22* (2019.01)
*G06F 16/11* (2019.01)
*G06F 16/23* (2019.01)
*G06F 16/28* (2019.01)

(52) U.S. Cl.
CPC ........ *G06F 16/2282* (2019.01); *G06F 16/125* (2019.01); *G06F 16/2358* (2019.01); *G06F 16/285* (2019.01)

(58) Field of Classification Search
CPC . G06F 16/285; G06F 16/2282; G06F 16/2358
USPC ........................................................ 707/609
See application file for complete search history.

(56) References Cited

U.S. PATENT DOCUMENTS

| | | | |
|---|---|---|---|
| 2005/0086195 A1* | 4/2005 | Tan .......................... | G06F 16/21 |
| 2023/0049221 A1* | 2/2023 | Rout ................... | G06F 16/2457 |
| 2025/0094421 A1* | 3/2025 | Gongloor .......... | G06F 16/24542 |

OTHER PUBLICATIONS

"Administering Oracle Advanced Authentication and Oracle Adaptive Risk Management"; https://docs.oracle.com/en/middleware/idm/advanced-authentication/oaarm/purging-and-archiving-transactional-data.html; downloaded on Oct. 30, 2024.

(Continued)

*Primary Examiner* — Hung T Vy
(74) *Attorney, Agent, or Firm* — Ryan, Mason & Lewis, LLP

(57) ABSTRACT

Techniques are provided for data retention management based on consistency of table growth and data purging activity. One method comprises obtaining changes in size over time of a database table; predicting, using a regression model, an estimated table size of the database table; evaluating data features that characterize an error associated with the prediction of the estimated table size of the database table by the regression model; characterizing a consistency of growth of the database table based on the error of the prediction; characterizing a consistency of data purging activities in a database system comprising the database table; and generating data retention recommendations for the database table based on (i) the characterization of the consistency of growth of the database table and (ii) the characterization of the consistency of the data purging activities; and initiating an automated action based on the data retention recommendations for the database table.

20 Claims, 11 Drawing Sheets

(56) References Cited

OTHER PUBLICATIONS

"Improving the Performance of the Archiving and Purging Process"; https://learn.microsoft.com/en-us/biztalk/core/improving-the-performance-of-the-archiving-and-purging-process; Feb. 1, 2021.
"2950474—DB Table Growth in Sap Hana Related to Packed LOB's"; SAP Knowledge Base Article—Preview; https://userapps.support.sap.com/sap/support/knowledge/en/2950474; downloaded on Oct. 30, 2024.

* cited by examiner

TABLE GROWTH AND DATA PURGING
CONSISTENCY CATEGORIES 200

| CATEGORY ID | TABLE GROWTH CONSISTENCY | DATA PURGING CONSISTENCY |
|---|---|---|
| 1 | TABLE HAS STAGNANT GROWTH | TABLE EXPERIENCES NO PURGING |
| 2 | TABLE HAS CONSISTENT GROWTH | TABLE EXPERIENCES NO PURGING |
| 3 | TABLE HAS INCONSISTENT GROWTH | TABLE EXPERIENCES NO PURGING |
| 4 | TABLE HAS STAGNANT GROWTH | TABLE EXPERIENCES CONSISTENT PURGING |
| 5 | TABLE HAS CONSISTENT GROWTH | TABLE EXPERIENCES CONSISTENT PURGING |
| 6 | TABLE HAS INCONSISTENT GROWTH | TABLE EXPERIENCES CONSISTENT PURGING |
| 7 | TABLE HAS STAGNANT GROWTH | TABLE EXPERIENCES INCONSISTENT PURGING |
| 8 | TABLE HAS CONSISTENT GROWTH | TABLE EXPERIENCES INCONSISTENT PURGING |
| 9 | TABLE HAS INCONSISTENT GROWTH | TABLE EXPERIENCES INCONSISTENT PURGING |

FIG. 2

REPRESENTATIVE DATA FEATURES 400

| DATA FEATURE | DATA SET 1 | DATA SET 2 |
|---|---|---|
| MAE1 | ACTUAL TABLE SIZE | ESTIMATED TABLE SIZE |
| MAE2 | MERGED LIST OF ACTUAL TABLE SIZE FOR DESIGNATED TIME INTERVALS | MERGED LIST OF ESTIMATED TABLE SIZE FOR DESIGNATED TIME INTERVALS |
| MAE3 | ESTIMATED TABLE SIZE | MERGED LIST OF ESTIMATED TABLE SIZE FOR DESIGNATED TIME INTERVALS |
| MAE4 | MEAN OF ACTUAL TABLE SIZE GROWTH | MEAN OF MERGED LIST OF TABLE SIZE GROWTH FOR DESIGNATED TIME INTERVALS |
| MEAN | MEAN OF MERGED LIST OF STANDARD DEVIATION OF TABLE SIZE GROWTH FOR DESIGNATED TIME INTERVALS | N/A |
| STANDARD DEVIATION1 | STANDARD DEVIATION OF MERGED LIST OF STANDARD DEVIATION OF TABLE SIZE GROWTH FOR DESIGNATED TIME INTERVALS | N/A |
| STANDARD DEVIATION2 | STANDARD DEVIATION AMONG MERGED LIST OF AVERAGE TABLE SIZE GROWTH FOR DESIGNATED TIME INTERVALS | N/A |

** WHERE "MAE" INDICATES MEAN ABSOLUTE ERROR

FIG. 4

CATEGORY-BASED DATA RETENTION
RECOMMENDATIONS 800

| CATEGORY ID | TABLE CHARACTERISTICS | DATA RETENTION RECOMMENDATIONS |
|---|---|---|
| 1 | STAGNANT GROWTH AND NO PURGING | ANALYZE DATA ACCESS REPORT AND PURGE UNUSED OR OBSOLETE DATA |
| 2 | CONSISTENT GROWTH AND NO PURGING | ANALYZE DATA ACCESS REPORT TO IDENTIFY UNUSED OR OBSOLETE DATA; SUGGEST SUITABLE RETENTION PERIOD, AUTOMATED PURGING FREQUENCY AND/OR AUTOMATED PURGING INTERVAL |
| 3 | INCONSISTENT GROWTH AND NO PURGING | ANALYZE DATA ACCESS REPORT TO IDENTIFY UNUSED OR OBSOLETE DATA; SUGGEST SUITABLE RETENTION PERIOD, AUTOMATED PURGING FREQUENCY AND/OR AUTOMATED PURGING INTERVAL |
| 4 | STAGNANT GROWTH AND CONSISTENT PURGING | NO ACTION |
| 5 | CONSISTENT GROWTH AND CONSISTENT PURGING | SUGGEST SHORTENING OF PURGING INTERVAL TO PREVENT EXPONENTIAL GROWTH |
| 6 | INCONSISTENT GROWTH AND CONSISTENT PURGING | ANALYZE DATA ACCESS REPORT TO IDENTIFY UNUSED OR OBSOLETE DATA; SUGGEST SUITABLE RETENTION PERIOD AND/OR SHORTENING OF PURGING INTERVAL |
| 7 | STAGNANT GROWTH AND INCONSISTENT PURGING | ANALYZE DATA ACCESS REPORT AND PURGE UNUSED OR OBSOLETE DATA AND/OR SUGGEST AUTOMATED CONSISTENT PURGING PROGRAM |
| 8 | CONSISTENT GROWTH AND INCONSISTENT PURGING | ANALYZE DATA ACCESS REPORT, SUGGEST SUITABLE RETENTION PERIOD, SHORTENING OF PURGING INTERVAL AND/OR AUTOMATED CONSISTENT PURGING |
| 9 | INCONSISTENT GROWTH AND INCONSISTENT PURGING | ANALYZE DATA ACCESS REPORT TO IDENTIFY UNUSED OR OBSOLETE DATA; SUGGEST SUITABLE RETENTION PERIOD, SUITABLE PURGING FREQUENCY AND INTERVAL AND/OR AUTOMATED CONSISTENT PURGING |

FIG. 8

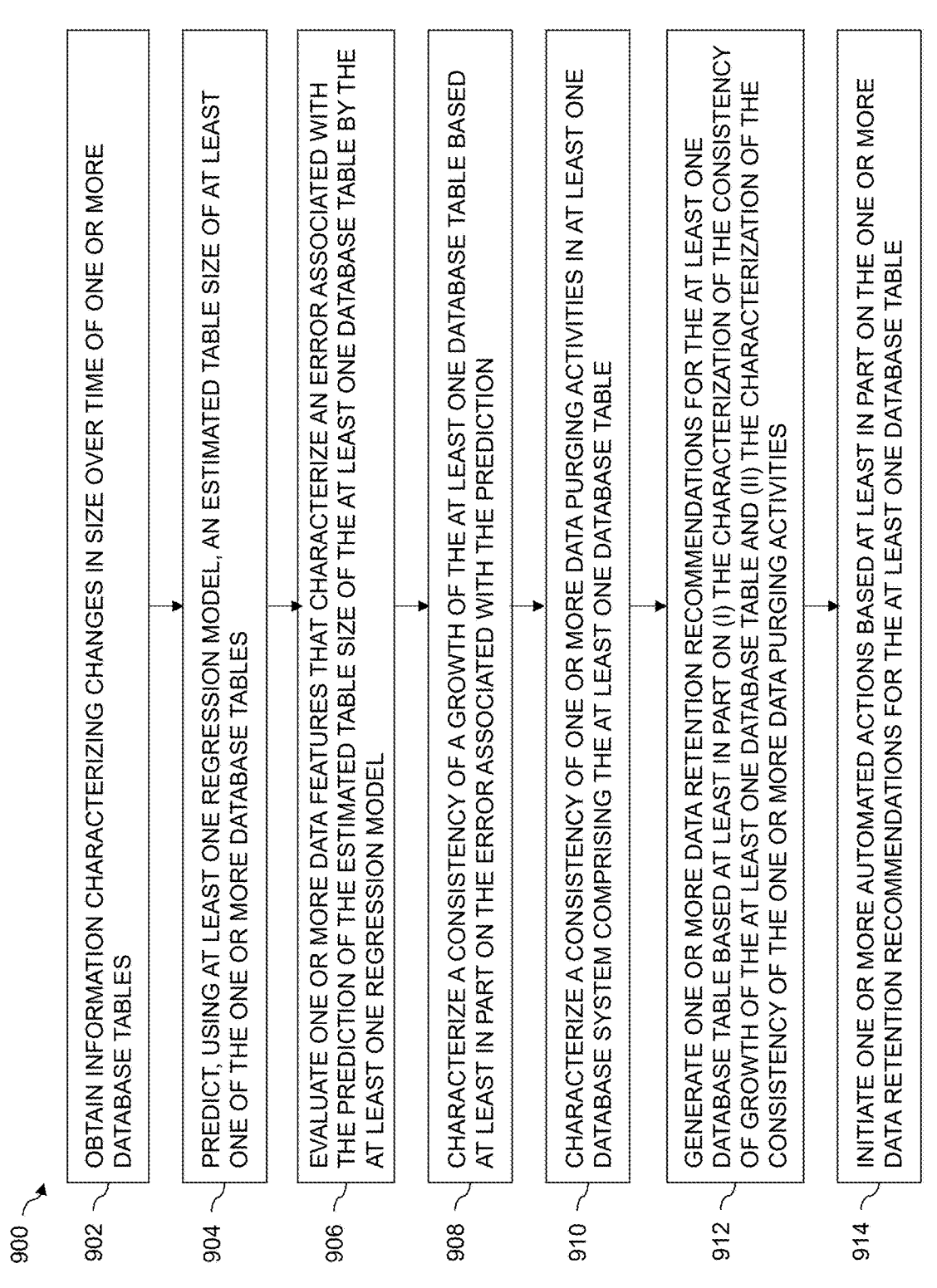

902 — OBTAIN INFORMATION CHARACTERIZING CHANGES IN SIZE OVER TIME OF ONE OR MORE DATABASE TABLES

904 — PREDICT, USING AT LEAST ONE REGRESSION MODEL, AN ESTIMATED TABLE SIZE OF AT LEAST ONE OF THE ONE OR MORE DATABASE TABLES

906 — EVALUATE ONE OR MORE DATA FEATURES THAT CHARACTERIZE AN ERROR ASSOCIATED WITH THE PREDICTION OF THE ESTIMATED TABLE SIZE OF THE AT LEAST ONE DATABASE TABLE BY THE AT LEAST ONE REGRESSION MODEL

908 — CHARACTERIZE A CONSISTENCY OF A GROWTH OF THE AT LEAST ONE DATABASE TABLE BASED AT LEAST IN PART ON THE ERROR ASSOCIATED WITH THE PREDICTION

910 — CHARACTERIZE A CONSISTENCY OF ONE OR MORE DATA PURGING ACTIVITIES IN AT LEAST ONE DATABASE SYSTEM COMPRISING THE AT LEAST ONE DATABASE TABLE

912 — GENERATE ONE OR MORE DATA RETENTION RECOMMENDATIONS FOR THE AT LEAST ONE DATABASE TABLE BASED AT LEAST IN PART ON (I) THE CHARACTERIZATION OF THE CONSISTENCY OF GROWTH OF THE AT LEAST ONE DATABASE TABLE AND (II) THE CHARACTERIZATION OF THE CONSISTENCY OF THE ONE OR MORE DATA PURGING ACTIVITIES

914 — INITIATE ONE OR MORE AUTOMATED ACTIONS BASED AT LEAST IN PART ON THE ONE OR MORE DATA RETENTION RECOMMENDATIONS FOR THE AT LEAST ONE DATABASE TABLE

DATA RETENTION MANAGEMENT BASED ON CONSISTENCY OF TABLE GROWTH AND DATA PURGING ACTIVITY

BACKGROUND

Data purging is a technique to remove data from a storage system or database in order to reclaim storage space, reduce security risks and/or improve data processing. Data purging techniques often employ data retention policies to identify data that may be purged.

SUMMARY

Illustrative embodiments of the disclosure provide techniques for data retention management based on consistency of table growth and data purging activity. One method includes obtaining information characterizing changes in size over time of one or more database tables; predicting, using at least one regression model, an estimated table size of at least one of the one or more database tables; evaluating one or more data features that characterize an error associated with the prediction of the estimated table size of the at least one database table by the at least one regression model; characterizing a consistency of a growth of the at least one database table based at least in part on the error associated with the prediction; characterizing a consistency of one or more data purging activities in at least one database system comprising the at least one database table; generating one or more data retention recommendations for the at least one database table based at least in part on (i) the characterization of the consistency of growth of the at least one database table and (ii) the characterization of the consistency of the one or more data purging activities; and initiating one or more automated actions based at least in part on the one or more data retention recommendations for the at least one database table.

Illustrative embodiments can provide significant advantages relative to conventional techniques. For example, technical problems related to such conventional techniques are mitigated in one or more embodiments by evaluating a consistency of database table growth and a consistency of data purging activities to generate data retention recommendations.

These and other illustrative embodiments described herein include, without limitation, methods, apparatus, systems, and computer program products comprising processor-readable storage media.

BRIEF DESCRIPTION OF THE DRAWINGS

FIG. 2 illustrates a number of representative table growth and data purging consistency categories in accordance with an illustrative embodiment;

FIG. 4 is a sample table illustrating a representative set of data features for evaluating a consistency of database table growth in accordance with an illustrative environment;

FIG. 8 is a sample table illustrating exemplary category-based data retention recommendations in accordance with an illustrative environment;

FIG. 9 is a flow diagram illustrating an exemplary implementation of a process for data retention management based on consistency of table growth and data purging activity in accordance with an illustrative embodiment;

DETAILED DESCRIPTION

Figure 1:
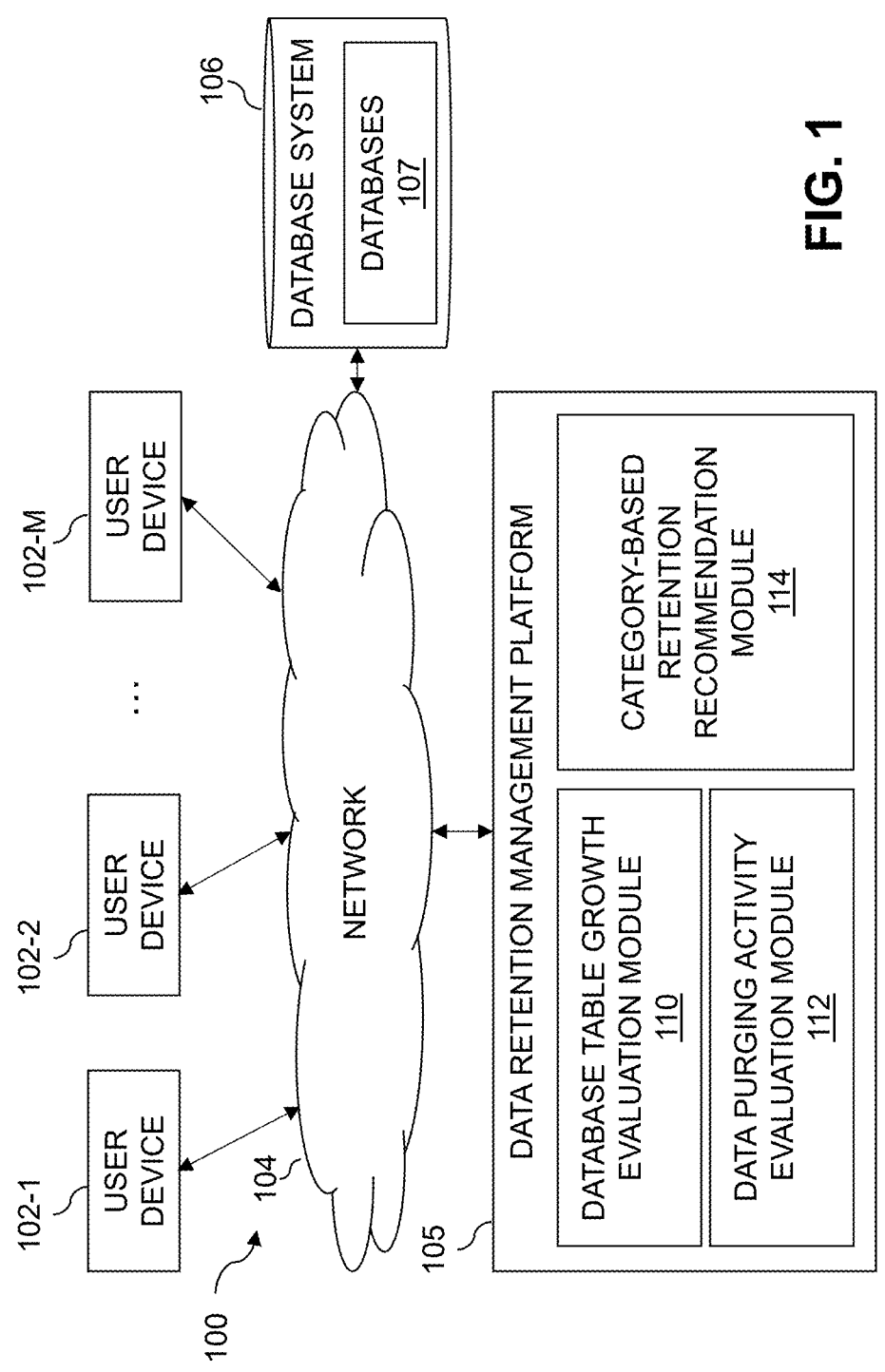
FIG. 1 illustrates an information processing system configured for data retention management based on consistency of table growth and data purging activity in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data retention management based on consistency of table growth and data purging activity.

One or more aspects of the disclosure recognize that inadequate or improper data purging can result in a proliferation of unused data in database tables, for example. An accumulation of such unused data may result in wasted storage space, increased storage costs and/or a reduction in the efficiency of databases (e.g., potentially resulting in slower query performance, longer backup times and/or longer restore times).

A common database purging strategy is to compare data timestamps to a data retention policy, so that unnecessary data can be identified for purging. Such a fixed retention policy, however, may not account for diverse data types with varying lifecycles (for example, temporary logs or cache data having a short lifecycle should be purged more frequently). Therefore, an organization may need a mechanism to evaluate existing data purging methods, and to advise on how and when to purge old and/or unused data.

In one or more embodiments, table growth patterns and data purging activities are analyzed to understand historical user behaviors with respect to database tables, and to classify the database tables into an appropriate data retention category based on the respective table growth pattern and the data purging activity. The existing data disposal strategies can be evaluated to recommend better data purging procedures corresponding to each category. This can help an organization to further enhance the purging/archiving methods and to consequently improve consistency and efficiency of a data purging process.

The disclosed techniques for data retention management based on consistency of table growth and data purging activity, in at least some embodiments, detects inconsistent growth using a linear regression model to analyze a table size growth trend and pattern. In addition, numerous data features are defined and a clustering model is employed to determine a consistency of table growth.

Further, a trend in table size reduction is analyzed in at least some embodiments to determine a consistency of purging activity. In one or more embodiments, a data access audit report and historical purging activities are analyzed to discover and recommend a suitable data retention period and purging frequency to automate consistent purging activities. The automation of purging activities reduces a risk of human error, reduces a time spent with manual purging, while also enhancing the existing data purging strategy.

As noted above, table growth patterns and data purging activities are analyzed to understand historical user behaviors with respect to database tables, and to classify the database tables into an appropriate category based on the respective table growth pattern and the data purging activity.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a data retention management platform 105 and a database system 106.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The data retention management platform 105 may comprise a database table growth evaluation module 110, a data purging activity evaluation module 112 and a category-based retention recommendation module 114. The database table growth evaluation module 110, in some embodiments, may evaluate the consistency of table growth by employing, for example, linear regression and clustering techniques, as discussed further below in conjunction with FIG. 5.

In at least some embodiments, the data purging activity evaluation module 112 may evaluate the consistency of data purging activities by evaluating table growth values and table growth trends, as discussed further below in conjunction with FIG. 5, analyzing data access reports to identify unused and/or orphaned data that may be purged and providing one or more recommendations with respect to a suitable data retention period and/or a suitable purging interval for an automated purging plan, as discussed further below in conjunction with FIGS. 6 and 7.

In one or more embodiments, the category-based retention recommendation module 114 provides data retention recommendations for a number of different database table categories that are based on the consistency of table growth and the consistency of data purging, as discussed further below in conjunction with FIG. 8, for example.

Exemplary processes utilizing elements 110, 112 and/or 114 will be described in more detail with reference to, for example, FIGS. 5 through 8.

It is to be appreciated that this particular arrangement of elements 110, 112 and/or 114 illustrated in the data retention management platform 105 of the FIG. 1 embodiment is presented by way of example only, and alternative arrangements can be used in other embodiments. For example, the functionality associated with the elements 110, 112 and/or 114 in other embodiments can be combined into a single module, or separated across a larger number of modules. As another example, multiple distinct processors can be used to implement different ones of the elements 110, 112 and/or 114 or portions thereof.

At least portions of elements 110, 112 and/or 114 may be implemented at least in part in the form of software that is stored in memory and executed by a processor.

Additionally, the database system 106 may comprise one or more databases 107. The one or more databases 107 may be configured to store data, for example, in tables, in a known manner. An example database 107, such as depicted in the present embodiment, can be implemented using one or more storage systems associated with the data retention management platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data retention management platform 105 are one or more input-output devices, which illustratively comprise keyboards, displays or other types of input-output devices in any combination. Such input-output devices can be used, for example, to support one or more user interfaces to the data retention management platform 105, as well as to support communication between data retention management platform 105 and other related systems and devices not explicitly shown.

Additionally, the data retention management platform 105 in the FIG. 1 embodiment is assumed to be implemented using at least one processing device. Each such processing device generally comprises at least one processor and an associated memory, and implements one or more functional modules for controlling certain features of the data retention management platform 105.

More particularly, the data retention management platform 105 in this embodiment can comprise a processor coupled to a memory and a network interface.

The processor illustratively comprises a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the data retention management platform 105 to communicate over the network 104 with the user devices 102, and illustratively comprises one or more conventional transceivers.

It is to be understood that the particular set of elements shown in FIG. 1 for the data retention management platform 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the data retention management platform 105 and databases 107 can be on and/or part of the same processing platform.

FIG. 2 illustrates a number of representative table growth and data purging consistency categories 200 in accordance with an illustrative embodiment. In the example of FIG. 2, database tables are classified into one of nine categories, for example, by combining an analysis of a consistency of table size growth (e.g., with options of stagnant growth, consistent growth and inconsistent growth, for example) and a consistency of purging activities (e.g., with options of no purging, consistent purging and inconsistent purging, for example). The categorization based on consistency of table purging activities and the consistency of table growth may be used, for example, to identify problematic tables and to prioritize purging activities, as discussed hereinafter.

Figure 3:
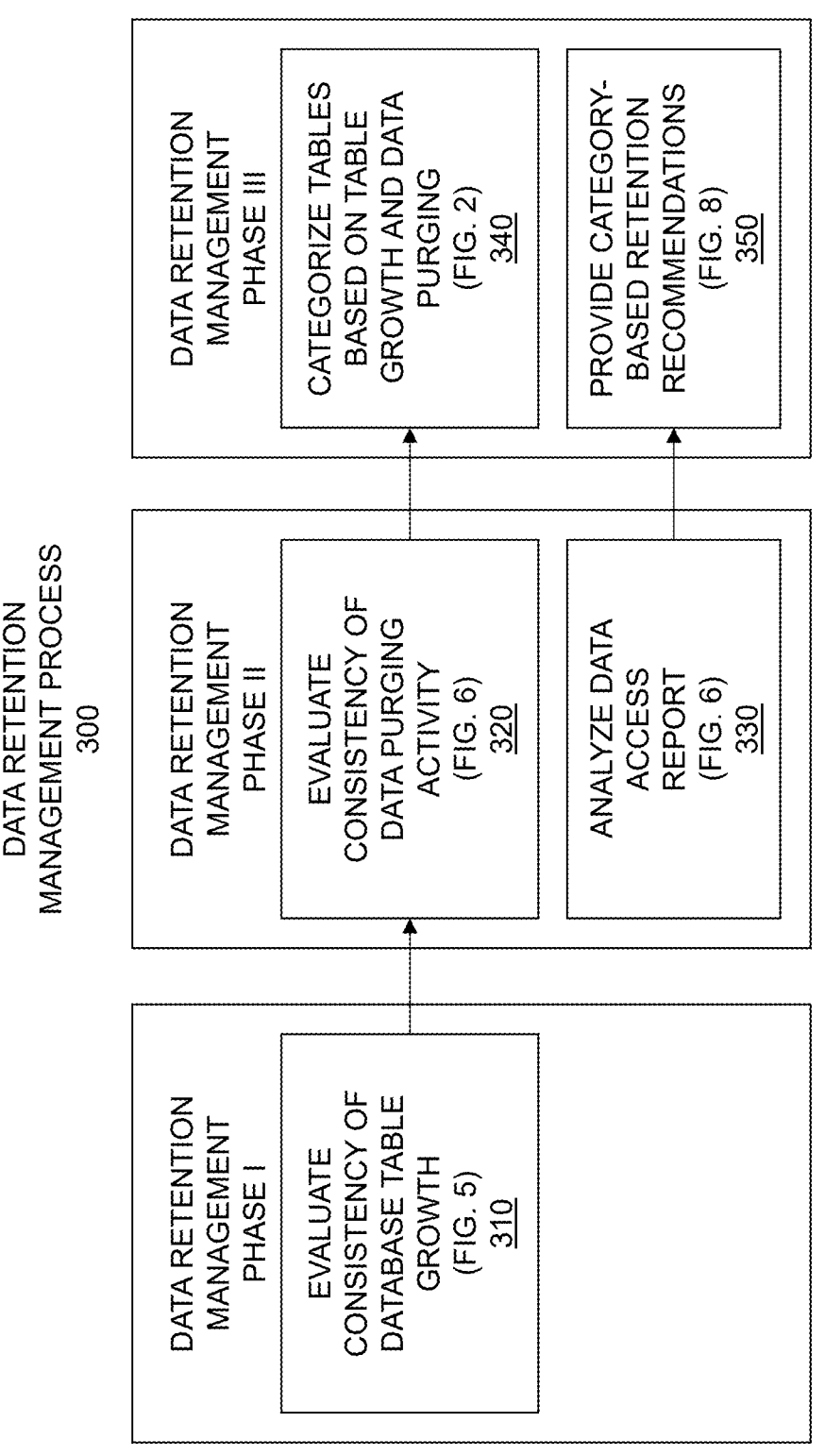
FIG. 3 is a flow diagram illustrating an exemplary implementation of a multi-phase process for data retention management based on consistency of table growth and data purging activity in accordance with an illustrative embodiment.

FIG. 3 is a flow diagram illustrating an exemplary implementation of a multi-phase process for data retention management based on consistency of table growth and data purging activity in accordance with an illustrative embodiment. In the example of FIG. 3, a first phase of the data retention management process 300 comprises evaluating a consistency of database table growth in step 310, for example, using linear regression and clustering techniques, as discussed further below in conjunction with FIG. 5. Thereafter, in a second phase of the data retention management process 300, a consistency of data purging activity may be evaluated in step 320, as discussed further below in conjunction with FIG. 6. In addition, a data access report is analyzed in step 330 to identify a suitable data retention period and purging frequency for automating purging activity, as discussed further below in conjunction with FIG. 6, for example.

In a third phase of the data retention management process 300, one or more tables are categorized into one of the consistency categories of FIG. 2 in step 340, based on the table growth evaluated in step 310 and the data purging activity evaluated in step 320. Finally, category-based retention recommendations are provided in step 350, as discussed further below in conjunction with FIG. 8, for example.

In one or more embodiments, machine learning models are employed to evaluate a consistency of table size growth based on a number of designated data features, as discussed further below in conjunction with FIG. 4. A linear regression model may be employed to analyze trends and/or patterns associated with the table size growth. After a representative set of data features, discussed further below in conjunction with FIG. 4, are evaluated, a clustering model may be employed to categorize and determine a consistency of the table growth.

The linear regression model may be used to find a line of best fit indicating an underlying table growth trend in the historical data. The linear regression model may employ the following equation to characterize the best fit line:

$$Y_i = \beta_0 + \beta_1 X_i \tag{1}$$

where $Y_i$ is a dependent variable, $\beta_0$ is a constant or intercept value, $\beta_1$ is a slope or coefficient value and $X_i$ is an independent variable. In some embodiments, the best fit line is obtained for one or more designated time periods (such as yearly, half-yearly, quarterly and/or monthly time periods). In addition, the linear regression model may be used to estimate the data for the designated time periods (such as yearly, half-yearly, quarterly and/or monthly time periods).

In some embodiments, the mean absolute error between the entire actual historical table size and an estimated output produced by the linear regression model may be expressed as follows:

$$MAE = \frac{\sum_{i=1}^{n} |y_i - x_i|}{n} \tag{2}$$

where MAE indicates the mean absolute error, $y_i$ is a prediction by the linear regression model, $x_i$ is a true historical value, and n is a total number of data points.

FIG. 4 is a sample table illustrating a representative set of data features 400 for evaluating a consistency of database table growth in accordance with an illustrative environment. In the example of FIG. 4, the representative data features are based on the mean absolute error metric defined above for various data sets, as well as one or more mean values and one or more standard deviation measures.

For example, a first mean absolute error feature (MAE1) between the entire actual table size and estimated table size may be used to compare an overall trend for a designated time period (e.g., a trend for a full year). MAE1 may be calculated using equation (2) above, with the actual table size as a first data set and an estimated table size as a second data set.

A second mean absolute error feature (MAE2) between (i) a merged list of actual table sizes for designated time intervals and (ii) a merged list of estimated table sizes for designated time intervals may be used to evaluate different time periods to reveal consistent trends over various time intervals. MAE2 may be calculated using equation (2) above, with a merged list of actual table sizes as a first data set and a merged list of estimated table sizes as a second data set. The designated time intervals may comprise yearly, half-yearly, quarterly and/or monthly time intervals.

Similarly, a third mean absolute error feature (MAE3) may be determined between the estimated table size and the merged list of estimated table sizes for one or more designated time intervals. A fourth mean absolute error feature (MAE4) may be determined between the mean of the actual table size growth and a mean of the merged list of estimated table size growth for one or more designated time intervals.

In one or more embodiments, a quarterly merged list of table data, for example, comprises a combination (e.g., a concatenation) of four separated quarterly actual (or estimated) data lists into a single data list. For example, [a], [b], [c], [d]→[a, b, c, d], where a, b, c and d represent actual (or estimated) quarterly table size values.

For example, MAE3, between the estimated entire table size and the merged list of quarterly estimated table size, may be determined as follows:

1. Consider 365 table size data points (e.g., in gigabytes) for a year:
   Representative actual entire table size data: [100, 108, 125, 128, . . . , 589];
2. The linear regression model is used to generate a linear line representing the estimated table size for the year:
   Representative estimated entire table size data: [100, 110, 120, 130, . . . , 600];
3. The actual table size data, from step 1, is then grouped into four quarters (e.g., a first group from: January through March, a second group from: April through June, a third group from: July through September, and a fourth group from: October through December);
4. The linear regression model is used to generate a linear line representing the estimated table size for each quarterly group:
   Estimated first quarter table size data: [100, 112, 124, . . . ],
   Estimated second quarter table size data: [230, 235, 240, . . . ],
   Estimated third quarter table size data: [340, 345, 350, . . . ],
   Estimated fourth quarter table size data: [500, 515, 530, . . . , 590];
5. The four estimated data lists from step 4 are then merged or combined into a single list of 365 data points:
   Merged list of quarterly estimated table size data: [100, 112, 124, . . . , 230, 235, 240, . . . , 340, 345, 350, . . . , 500, 515, 530, . . . , 590];
6. The estimated data lists from step 2 and step 4 are then compared, and MAE3 is calculated, as follows:
   From step 2: Estimated entire table size data: [100, 110, 120, 130 . . . , 600], From step 4: Merged list of quarterly estimated table size data: [100, 112, 124, . . . , 230, 235, 240, . . . , 340, 345, 350, . . . , 500, 515, 530, . . . , 590], $$MAE3 = \frac{|100-100| + |110-112| + |120-124| + \ldots |600-590|}{365}.$$

The merged lists for MAE2 and MAE4 may be determined in a similar manner as the above techniques for determining the quarterly merged list for MAE3. Similarly, the merged lists for different time intervals may be determined in a similar manner as the above techniques for determining the quarterly merged list for MAE3. Generally, with respect to MAE3, for example, a larger value of MAE3 between the overall trend and the quarterly trend indicates that the growth is not consistent, as discussed further below in conjunction with FIG. 5.

In addition, in the example of FIG. 4, a first standard deviation feature (StandardDeviation1 or $\sigma_1$) may be determined by taking a standard deviation of a merged list of standard deviations of table size growth for designated time intervals. In some embodiments, the first standard deviation feature, $\sigma_1$, may be expressed as follows:

$$\sigma_1 = \sqrt{\frac{\sum_{i=1}^{n} |x_i - \mu|}{N}}. \tag{3}$$

where $\mu$ represents the mean of the merged list of standard deviation of the table size growth for the designated time interval.

Consider a database table that may be exhibiting inconsistent growth and may have a standard deviation value of table size growth for a first quarter time interval of 200, for a second quarter time interval of 300, for a third quarter time interval of 250 and for a fourth quarter time interval of 350. Thus, the merged list of standard deviation of table size growth for a quarterly time interval may be expressed as [200, 300, 250, 350]. The mean of the merged list of standard deviation of table size growth for the quarterly time interval may be determined as follows:

$$\text{Mean of merged list} = \frac{200 + 300 + 250 + 350}{4} = 275.$$

Finally, the standard deviation of the merged list of standard deviations of table size growth for the quarterly time interval may be determined as follows:

$$\sigma_1 = \sqrt{\frac{(200-275)^2 + (300-275)^2 + (250-275)^2 + (350-275)^2}{4}} = 55.90.$$

Similarly, consider a database table that may be exhibiting consistent growth and may have a standard deviation value of table size growth for a first quarter time interval of 200, for a second quarter time interval of 210, for a third quarter time interval of 220 and for a fourth quarter time interval of 215. Thus, the merged list of standard deviation of table size growth for a quarterly time interval may be expressed as [200, 210, 220, 215]. The mean of the merged list of standard deviation of table size growth for the quarterly time interval may be determined as follows:

$$\text{Mean of merged list} = \frac{200 + 210 + 220 + 215}{4} = 211.25.$$

Finally, the standard deviation of the merged list of standard deviations of table size growth for the quarterly time interval may be determined as follows:

$$\sigma_1 = \sqrt{\frac{(200 - 211.25)^2 + (210 - 211.25)^2 + (220 - 211.25)^2 + (215 - 211.25)^2}{4}}$$

$$= 7.395.$$

If the standard deviation among standard deviation of four quarters, for example, is low, it represents that the dispersion of the four quarters table growth data is low, meaning that the growth is more consistent.

In addition, in the example of FIG. 4, a second standard deviation feature (StandardDeviation2) may be determined by taking a standard deviation among a merged list of average table size growth for designated time intervals. In some embodiments, the second standard deviation feature, $\sigma_2$, may be expressed as follows:

$$\sigma_2 = \sqrt{\frac{\sum_{i=1}^{n} |x_i - \mu|}{N}}. \tag{4}$$

where $\mu$ represents the mean of the merged list of average table size growth for the designated time interval.

Consider a database table that may be exhibiting inconsistent growth and may have an average or mean value of table size growth for a first quarter time interval of 1000, for a second quarter time interval of 2200, for a third quarter time interval of 2800 and for a fourth quarter time interval of 3000. Thus, the merged list of average table size growth for a quarterly time interval may be expressed as [1000, 2200, 2800, 3000]. The mean of the merged list of average table size growth for the quarterly time interval may be determined as follows:

$$\text{Mean of merged list} = \frac{1000 + 2200 + 2800 + 3000}{4} = 2250.$$

Finally, the standard deviation of the merged list of average table size growth for the quarterly time interval may be determined as follows:

$$\sigma_1 = \sqrt{\frac{(1000 - 2250)^2 + (2200 - 2250)^2 + (2800 - 2250)^2 + (3000 - 2250)^2}{4}} =$$

$$779.42.$$

Similarly, consider a database table that may be exhibiting consistent growth and may have an average or mean table size growth for a first quarter time interval of 1000, for a second quarter time interval of 1100, for a third quarter time interval of 1300 and for a fourth quarter time interval of 1200. Thus, the merged list of standard deviation of table size growth for a quarterly time interval may be expressed as [1000, 1100, 1300, 1200]. The mean of the merged list of average table size growth for the quarterly time interval may be determined as follows:

$$\text{Mean of merged list} = \frac{1000 + 1100 + 1300 + 1200}{4} = 1150.$$

Finally, the standard deviation of the merged list of standard deviations of table size growth for the quarterly time interval may be determined as follows:

$$\sigma_2 = \sqrt{\frac{(1000 - 1150)^2 + (1100 - 1150)^2 + (1300 - 1150)^2 + (1200 - 1150)^2}{4}} =$$

$$111.80.$$

If the standard deviation among the average or mean of four quarters is low, it represents that the dispersion of the table growth data over the four quarters is low, indicating that the growth is more consistent.

Figure 5:
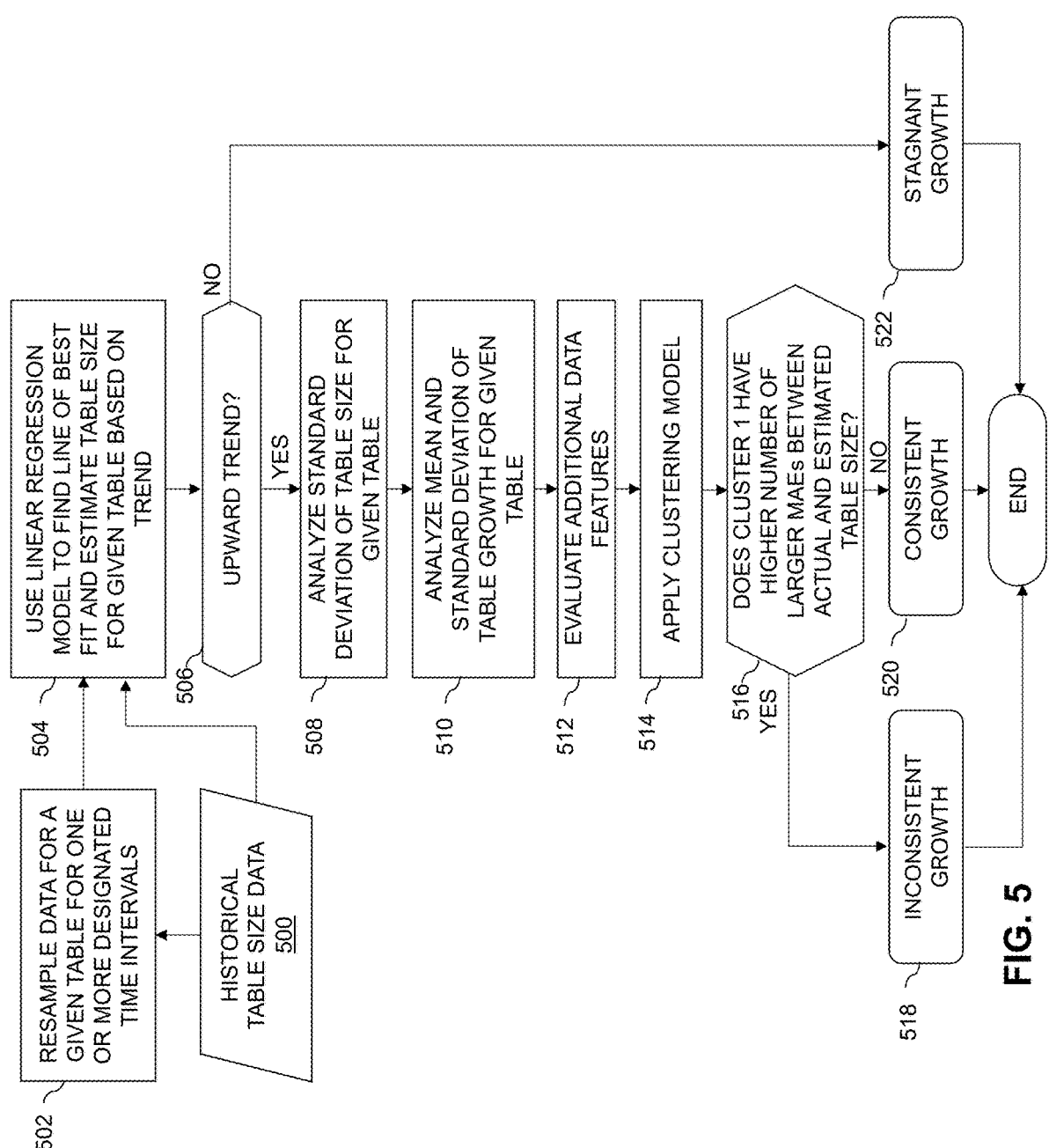
FIG. 5 is a flow diagram illustrating an exemplary implementation of a process for evaluating a consistency of table growth in accordance with an illustrative embodiment.

FIG. 5 is a flow diagram illustrating an exemplary implementation of a process for evaluating a consistency of table growth in accordance with an illustrative embodiment. In one or more embodiments, the process determines a consistency label characterizing the table growth (e.g., inconsistent table growth, consistent table growth or stagnant table growth, for example) by applying linear regression and clustering techniques.

In the example of FIG. 5, historical table size data 500 for a given table is resampled in step 502 for one or more designated time intervals (e.g., as discussed above for the quarterly MAE3 data feature). As noted above, the designated time intervals may comprise yearly, half-yearly, quarterly and/or monthly time intervals.

In step 504, a linear regression model is used to find a line of best fit in the resampled data and to estimate the table size for the given table based on the trend. A test is performed in step 506 to determine if the trend is an upward trend. If it is determined in step 506 that the trend is not an upward trend, then program control proceeds to step 522 where a consistency label characterizing the table growth as stagnant table growth is assigned to the given table before program control terminates.

If it is determined in step 506 that the trend is an upward trend, then the standard deviation of the table size for the given table is analyzed for one or more designated time periods (e.g., for each month, quarter and/or half-year) in step 508.

In addition, the mean and the standard deviation of the table size growth for the given table for one or more designated time periods (e.g., for each month, quarter and/or half-year) are analyzed in step 510. In step 512, one or more additional representative data features of FIG. 4 are evaluated.

A clustering model, such as a k-means clustering technique, is applied to the evaluated data features in step 514 to cluster the data to separate the tables into a first cluster associated with consistent growth or a second cluster associated with inconsistent growth. In at least one embodiment, the clustering model may find the centroid of each feature, and categorize tables into two different clusters (based on the distance of feature values of each table from the feature centroid, for example).

In one or more embodiments, the clustering model starts by scaling or normalizing the numerical data features to have a mean of 0, and a standard deviation of 1. Then, a k-means clustering algorithm may be used in at least some embodiments to calculate the Euclidean distance from the center of each cluster. Each numerical data feature observation belongs to the cluster with the nearest center. The center or centroid may be represented using an average value that is generated during a training phase.

The clustering model, however, may not provide the name of each cluster (e.g., whether a given cluster is a cluster associated with consistent growth or a cluster associated with inconsistent growth). Thus, to differentiate and name a given cluster, the maximum values of each MAE value in each cluster are compared.

Generally, the MAE metric has a higher weight for differentiating the consistency of growth, so the MAE is used for comparison in at least some embodiments. The maximum value or the centroid of the MAE metric found by the model in each cluster may be used. Consider two clusters (cluster 1 and cluster 2) having the following exemplary values of the MAE metrics outlined in FIG. 4:

| Cluster 1 | Cluster 2 |
|---|---|
| Maximum value of MAE1: 200 | Maximum value of MAE1: 10 |
| Maximum value of MAE2: 800 | Maximum value of MAE2: 15 |
| Maximum value of MAE3: 300 | Maximum value of MAE3: 600 |
| Maximum value of MAE4: 1000 | Maximum value of MAE4: 40 |

As noted above, the maximum MAE value in the two clusters are compared, as follows:

Maximum value of MAE1 in cluster 1>cluster 2: True;

Maximum value of MAE2 in cluster 1>cluster 2: True;

Maximum value of MAE3 in cluster 1>cluster 2: False; and

Maximum value of MAE4 in cluster 1>cluster 2: True.

To identify the cluster associated with inconsistent growth (as opposed to consistent growth), the mode of the clusters may be evaluated (e.g., the cluster having the highest number of larger MAE metrics). If the mode of a given cluster is true, then the given cluster is the cluster associated with inconsistent growth. In the above example, cluster 1 had the highest number of larger MAE metrics and cluster 1 is associated with inconsistent growth.

Thus, a test is performed in step 516 to determine which cluster has more larger MAE values, relative to the other cluster, between the actual table size and the estimated table size. As noted above, the cluster having the highest number of larger MAE metrics indicates that the growth of the tables in the cluster is inconsistent. Thus, if it is determined in step 516 that cluster 1 has more larger MAE values between the actual table size and the estimated table size, then a consistency label characterizing the table growth as inconsistent table growth is assigned to the tables in cluster 1 in step 518 before program control terminates. If, however, it is determined in step 516 that cluster 2 has more larger MAE values between the actual table size and the estimated table size, then a consistency label characterizing the table growth as consistent table growth is assigned to the tables in cluster 2 in step 520 before program control terminates.

Figure 6:
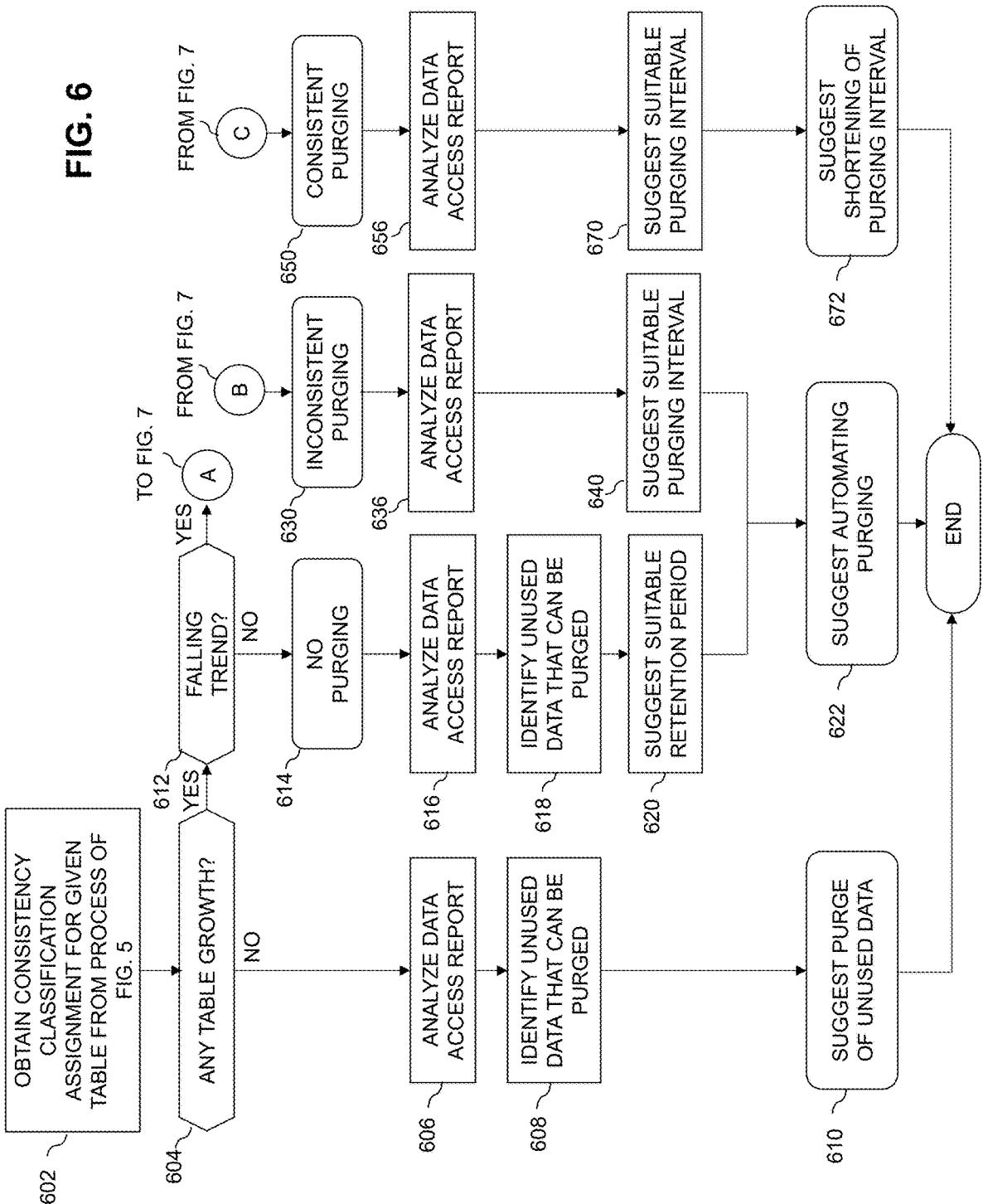
FIG. 6 is a flow diagram illustrating an exemplary implementation of a process for evaluating a consistency of purging activity in accordance with an illustrative embodiment.

FIG. 6 is a flow diagram illustrating an exemplary implementation of a process for evaluating a consistency of purging activity in accordance with an illustrative embodiment. In the example of FIG. 6, a consistency classification assignment for a given table is obtained in step 602 from the process of FIG. 5. A test is performed in step 604 to determine if there is any table growth for the given table (for example, by evaluating a slope of the table size, identifying the growth rate).

If it is determined in step 604 that there is no table growth, then program control proceeds to step 606 where the data access report is analyzed. In step 608, unused data that can be purged is identified from the data access report. In step 610, a purging of the identified unused data is suggested.

If, however, it is determined in step 604 that there is table growth, then a further test is performed in step 612 to determine if there is a falling growth trend for the given table (e.g., a table growth with a falling trend indicates that purging is occurring). If, however, it is determined in step 612 that there is a falling growth trend, then program control proceeds to the process of FIG. 7, discussed below.

If it is determined in step 612 that there is not a falling growth trend, then the given table is classified in step 614 as not having any purging. Program control then proceeds to step 616 where the data access report is analyzed to identify the unused or orphaned data. If there is frequent access to data in the entire table, the table will be marked as the table saving the master data, which cannot be purged. Thus, no action is required from users. In step 618, unused data that can be purged is identified from the data access report. A suitable retention period is suggested in step 620. In step 622, an automated purging program is suggested (for example, to purge the unused data identified in step 618). If data older than N days should not be used (e.g., an expected expiration period), then the value of N will be proposed as the most suitable retention period of data in step 620. For example, if data older than two years has not been accessed, then a retention period of two years may be suggested as a suitable retention period.

Figure 7:
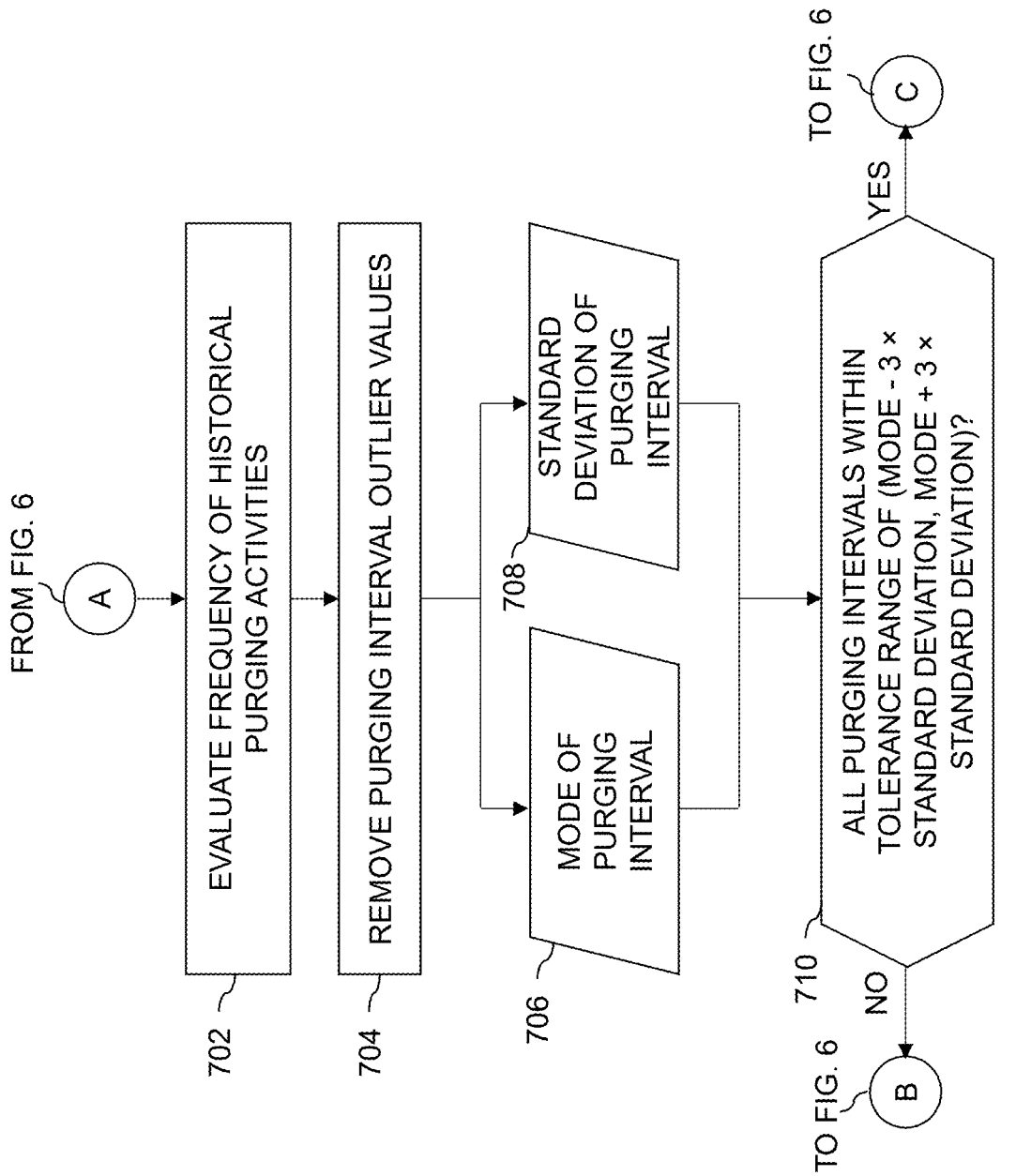
FIG. 7 is a flow diagram illustrating an exemplary implementation of a process used by the process of FIG. 6 to determine whether purging activities are performed with a consistent time interval in accordance with an illustrative embodiment.

Based on a classification performed by the process of FIG. 7, program control returns to FIG. 6 at step 630 or step 650. If program control returns from FIG. 7 to FIG. 6 at step 630, then the given table is classified in step 630 as having inconsistent purging. Program control then proceeds to step 636 where the data access report is analyzed. In step 640, a suitable purging interval is suggested. For example, a suitable purging interval may be determined by combining the information extracted from the growth trend and the data access record to identify a suitable interval for purging activity. In step 622, an automated purging program is suggested with the suggested purging interval to improve the consistency of the purging, and/or reduce the risk of human error and time consumption associated with manual purging.

If program control returns from FIG. 7 to FIG. 6 at step 650, then the given table is classified in step 650 as having consistent purging. One or more aspects of the disclosure recognize that tables with consistent purging but that are still growing signify that the current purging strategy is not sufficient. Program control proceeds to step 656 where the data access report is analyzed. In step 670, a suitable purging interval is suggested. A more enhanced purging strategy may be employed by suggesting an increase to the purging frequency and thus avoid the unexpected table growth. Thus, in step 672, a shortening of the purging interval is suggested to increase the purging frequency.

One or more aspects of the disclosure recognize that if a given table has a consistent purging strategy, then the table is expected to not grow, and the average gradient is flat (e.g., not slanted). Tables that experience consistent purging but that are still growing signify that the current purging strategy is not suitable. In a database, free allocated space is difficult to shrink, as it will cause a fragmentation issue and may waste space. Thus, whenever data can be purged, purging should be performed as frequently as possible to avoid unexpected storage consumption. Therefore, purging should be performed more frequently to reduce growth and store only necessary data. Thus, in one or more embodiments, the disclosed techniques for data retention management based on consistency of table growth and data purging activity will suggest the most suitable interval based on the analysis described here, to increase the purging frequency and thus avoid unexpected table growth.

FIG. 7 is a flow diagram illustrating an exemplary implementation of a process used by the process of FIG. 6 to determine whether purging activities are performed with a consistent time interval in accordance with an illustrative embodiment. As noted above, if it is determined in step 612 of FIG. 6 that there is a falling trend, then program control proceeds to step 702 of the process of FIG. 7. In the example of FIG. 7, the frequency of historical purging activities is evaluated.

One or more aspects of the disclosure recognize that negative growth in tables is usually caused by the release of space after a data purging is performed. One or more embodiments of the disclosure analyze the table size and falling trend in data, and calculate a purging interval (e.g., in terms of days), as a difference in the number of days between each purge operation. The daily difference in table size may be evaluated. If there is negative growth for a given day, then there was a purging activity on the given day.

In step 702, for example, the frequency of historical purging activities is evaluated. If the purging frequency is every month, then the purging interval is one month (e.g., approximately 30 days). If the automated and/or manual purging are performed monthly, then the number of days between each purging activity should be approximately 30 days (e.g., February has 28 or 29 days and other months have 30 or 31 days, so an appropriate tolerance band may be employed). If the observed purging intervals (in days) for a given table are [31, 28, 31, 30, 31, . . . ], then the given table can be classified as having consistent purging. If, however, the observed purging intervals (in days) for the given table are [60, 9, 15, 7, 80, . . . ], then the given table can be classified as having consistent purging.

In step 704, any outlier purging interval values (e.g., extreme values) may optionally be removed from the historical purging activities. For example, if there was a monthly purge that occurred on July 14$^{th}$, August 14$^{th}$, September 14$^{th}$ and October 14$^{th}$, but the table size data on August 14$^{th}$ and September 14$^{th}$ was not collected, then the calculated purging interval would be 90 days (difference in number of days between July 14$^{th}$ and October 14th). The calculated purging interval of 90 days will be marked as an outlier and removed from consideration if most of the calculated purging interval values were 30 days.

Thereafter, statistical data, such as a mode of the purging interval and a standard deviation of the purging interval are determined in steps 706 and 708, respectively. Generally, the mode and standard deviation of the purging interval are used to find a tolerance range to determine whether automatic purging is being used. In the example of FIG. 7, the lower end of the tolerance range is expressed as the mode (e.g., in number of days) of the purging interval minus three times the standard deviation, and the upper end of the tolerance range is expressed as the mode (e.g., in number of days) of the purging interval plus three times the standard deviation.

A test is performed in step 710 to determine if all purging intervals are within the tolerance range. If it is determined in step 710 that all purging intervals are within the tolerance range, then it may be inferred that there is consistent purging done automatically, for example, by a job scheduler and program control returns from FIG. 7 to FIG. 6 at step 650. If, however, it is determined in step 710 that all purging intervals are not within the tolerance range, then it may be inferred that purging is inconsistent, for example, due to a manual process, and program control returns from FIG. 7 to FIG. 6 at step 630.

FIG. 8 is a sample table illustrating exemplary predetermined category-based data retention recommendations 800, for the categories defined above in conjunction with FIG. 2, in accordance with an illustrative environment. In the example of FIG. 8, a first category comprises tables exhibiting stagnant growth and no purging activity. For the first category, the data retention recommendation is to analyze the data access report and to purge the unused or obsolete data.

A second category comprises tables exhibiting consistent growth and no purging activity. For the second category, the data retention recommendation is to analyze the data access report to identify unused or obsolete data; suggest a suitable retention period, an automated purging frequency and/or an automated purging interval. For example, if data older than two years has not been accessed, then a retention period of two years may be suggested as a suitable retention period. A monthly purging frequency and a 30-day purging interval may also be suggested.

A third category comprises tables exhibiting inconsistent growth and no purging activity. For the third category, the data retention recommendation is to analyze the data access report to identify unused or obsolete data; suggest a suitable retention period, an automated purging frequency and/or an automated purging interval.

A fourth category comprises tables exhibiting stagnant growth and consistent purging. For the fourth category, the data retention recommendation is to take no action. A fifth category comprises tables exhibiting consistent growth and consistent purging. For the fifth category, the data retention recommendation is to suggest a shortening of the purging interval to prevent exponential growth.

A sixth category comprises tables exhibiting inconsistent growth and consistent purging. For the sixth category, the data retention recommendation is to analyze the data access report to identify unused or obsolete data, suggest a suitable retention period and/or a shortening of the purging interval.

A seventh category comprises tables exhibiting stagnant growth and inconsistent purging. For the seventh category, the data retention recommendation is to analyze the data access report and to purge unused or obsolete data and/or suggest an automated consistent purging program.

An eighth category comprises tables exhibiting consistent growth and inconsistent purging. For the eighth category, the data retention recommendation is to analyze the data access report, suggest a suitable retention period, a shortening of the purging interval and/or an automated consistent purging program.

A ninth category comprises tables exhibiting inconsistent growth and inconsistent purging. For the ninth category, the data retention recommendation is to analyze the data access report to identify unused or obsolete data, suggest a suitable retention period, suggest a suitable purging frequency and interval, and/or suggest an automated consistent purging program.

The categories of FIG. 8 may be visualized in at least some embodiments using a pie chart, for example. With existing techniques, users need to spend a significant amount of time to determine which tables should be purged and how to purge the tables. In contrast, the categorization provided by the disclosed data retention management techniques provides users with better visibility on table purging and table growth behaviors and helps users to identify problematic tables. In this manner, users can prioritize their time to deal with tables in the important categories, such as focusing on addressing those tables that have purging and still experience abnormal and/or inconsistent growth.

FIG. 9 is a flow diagram illustrating an exemplary implementation of a process 900 for data retention management based on consistency of table growth and data purging activity in accordance with an illustrative embodiment. In the example of FIG. 9, information characterizing changes in size over time of one or more database tables is obtained in step 902. In step 904, at least one regression model predicts an estimated table size of at least one of the one or more database tables.

One or more data features are evaluated in step 906 that characterize an error associated with the prediction of the estimated table size of the at least one database table by the at least one regression model. A consistency of a growth of the at least one database table is characterized in step 908 based at least in part on the error associated with the prediction. A consistency of one or more data purging activities in at least one database system comprising the at least one database table is characterized in step 910.

One or more data retention recommendations are generated in step 912 for the at least one database table based at least in part on (i) the characterization of the consistency of growth of the at least one database table and (ii) the characterization of the consistency of the one or more data purging activities. One or more automated actions are initiated in step 914 based at least in part on the one or more data retention recommendations for the at least one database table.

In at least one embodiment, the at least one regression model comprises one or more linear regression models. The one or more data features that characterize the error associated with the prediction may comprise at least (i) a first mean average error data feature between an actual size over time of the at least one database table and an estimated size over time of the at least one database table and (i) a second mean average error data feature between a merged list of the actual size of the at least one database table for at least one designated time interval and a merged list of the estimated size of the at least one database table for the at least one designated time interval. The characterization of the consistency of growth of the at least one database table further may comprise processing the one or more data features for the at least one database table to cluster the at least one database table into a first cluster associated with consistent table growth or a second cluster associated with inconsistent table growth.

In some embodiments, the characterization of the consistency of the one or more data purging activities evaluates whether a frequency of purging activities for the at least one database table is performed within a designed purging interval. The at least one database table may be assigned to at least one of a plurality of categories based at least in part on (i) the characterization of the consistency of growth of the at least one database table and (ii) the characterization of the consistency of the one or more data purging activities and the generating the one or more data retention recommendations for the at least one database table may comprise obtaining one or more designated data retention recommendations associated with the assigned at least one category.

In one or more embodiments, a data access report may be evaluated to identify one or more of unused data and orphaned data and recommending a purging of the identified one or more of the unused data and the orphaned data. A retention period for data in the at least one database table may be recommended based at least in part on an expected expiration period of the data. The one or more automated actions may comprise at least one of: generating one or more notifications related to the one or more data retention recommendations; generating one or more signals related to the one or more data retention recommendations; providing information characterizing the one or more data retention recommendations to a display system; and controlling a performance of at least one action in another system using the one or more data retention recommendations.

The particular processing operations and other network functionality described in conjunction with FIGS. 3, 5 through 7 and 9, for example, are presented by way of illustrative example only, and should not be construed as limiting the scope of the disclosure in any way. Alternative embodiments can use other types of processing operations for data retention management based on consistency of table growth and data purging activity. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

One or more embodiments of the disclosure provide improved methods, apparatus and computer program products for data retention management based on consistency of table growth and data purging activity. The foregoing applications and associated embodiments should be considered as illustrative only, and numerous other embodiments can be configured using the techniques disclosed herein, in a wide variety of different applications.

It should also be understood that the disclosed techniques for data retention management based on consistency of table growth and data purging activity, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data retention management based on consistency of table growth and data purging activity may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments.

Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data retention management engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based data retention management platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
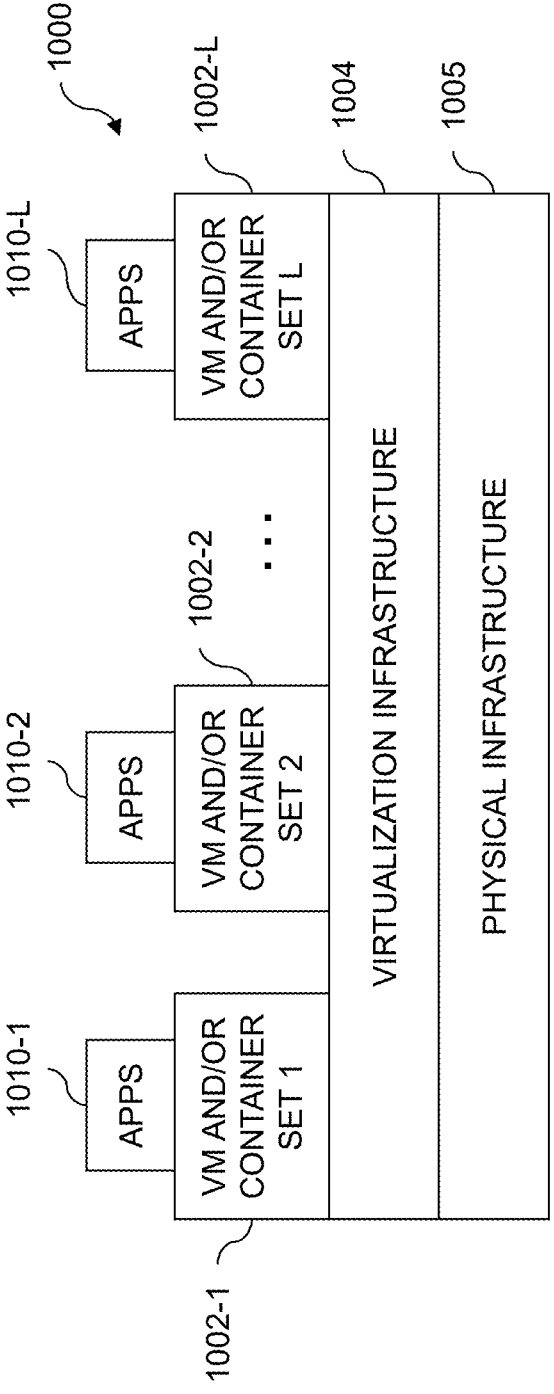
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide chat assistant adaptation functionality of the type described above for one or more processes running on a given one of the VMs. For example, each of the VMs can implement data retention management control logic and associated functionality for evaluating table growth and data purging activity.

An example of a hypervisor platform that may be used to implement a hypervisor within the virtualization infrastructure 1004 is a compute virtualization platform which may have an associated virtual infrastructure management system such as server management software. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide chat assistant adaptation functionality of the type described above for one or more processes running on different ones of the containers. For example, a container host device supporting multiple containers of one or more container sets can implement one or more instances of data retention management control logic and associated functionality for evaluating table growth and data purging activity.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
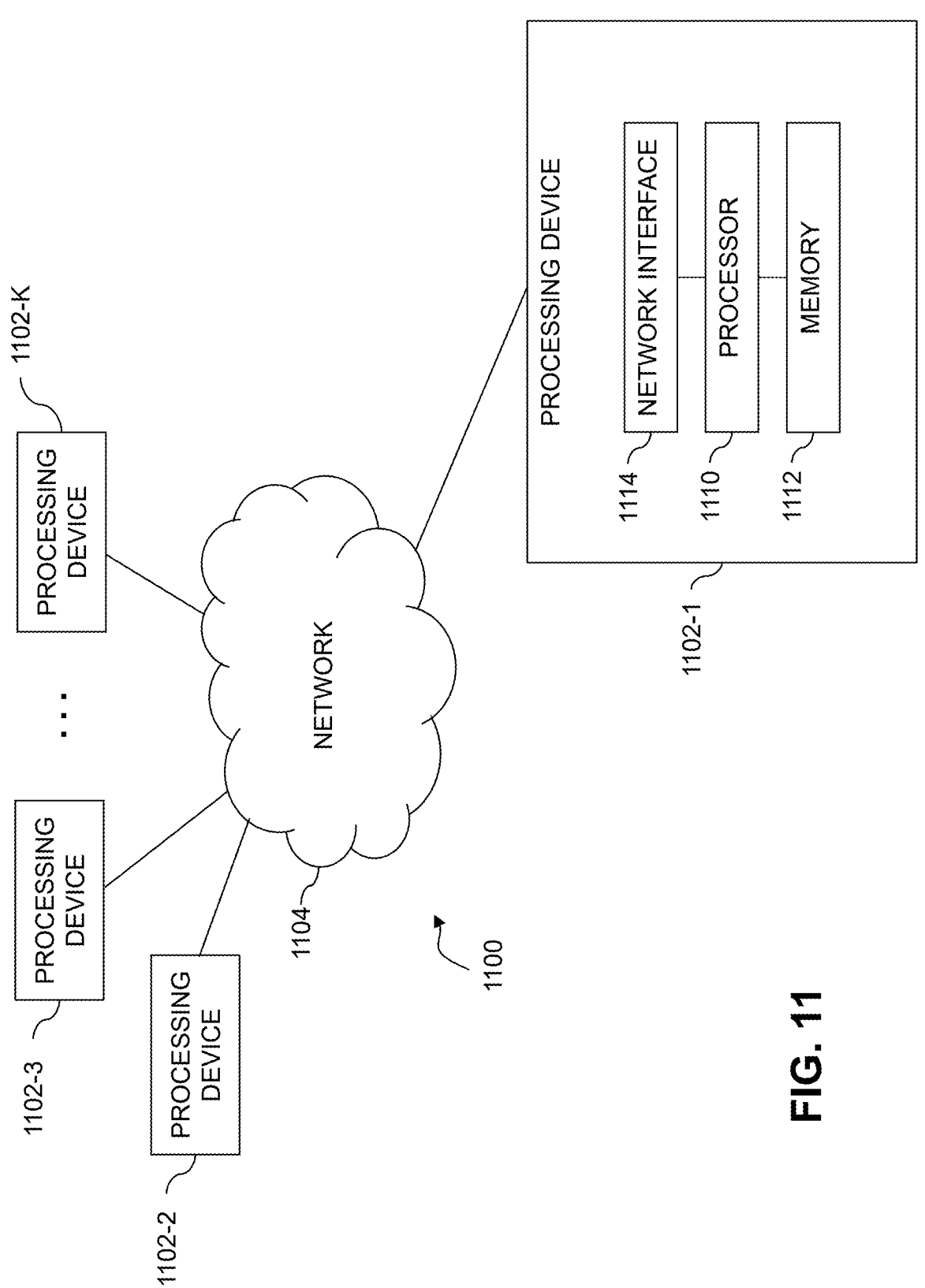
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method, comprising:

accessing, using at least one processing device, one or more data structures comprising information characterizing changes in size over time of one or more database tables;

predicting, using at least one processor-based regression model, an estimated table size of at least a given one of the one or more database tables;

evaluating one or more data features that characterize an error associated with the prediction of the estimated table size of at least the given database table by the at least one processor-based regression model;

characterizing, using at least one processor-based clustering model, a consistency of a growth of at least the given database table based at least in part on the error associated with the prediction;

characterizing a consistency of one or more data purging activities in at least one database system comprising at least the given database table;

automatically generating, using the at least one processing device, responsive to the consistency of growth characterization, one or more data retention recommendations for at least the given database table based at least in part on (i) the characterization of the consistency of growth of at least the given database table and (ii) the characterization of the consistency of the one or more data purging activities; and initiating one or more automated actions based at least in part on the one or more data retention recommendations for at least the given database table, wherein the one or more automated actions comprise at least one of: purging unused data associated with at least the given database table, purging obsolete data associated with at least the given database table, adjusting a suitable retention period for at least the given database table, adjusting an automated purging frequency for at least the given database table, adjusting an automated purging interval for at least the given database table and adjusting an automated purging program for at least the given database table;

wherein the method is performed by at least one processing device comprising a processor coupled to a memory.

2. The computer-implemented method of claim 1, wherein the at least one processor-based regression model comprises one or more linear regression models.

3. The computer-implemented method of claim 1, wherein the one or more data features that characterize the error associated with the prediction comprise at least (i) a first mean average error data feature between an actual size over time of at least the given database table and an estimated size over time of at least the given database table and (i) a second mean average error data feature between a merged list of the actual size of at least the given database table for at least one designated time interval and a merged list of the estimated size of at least the given database table for the at least one designated time interval.

4. The computer-implemented method of claim 1, wherein the characterization of the consistency of growth of at least the given database table further comprises processing the one or more data features for at least the given database table to cluster at least the given database table into a first cluster associated with consistent table growth or a second cluster associated with inconsistent table growth.

5. The computer-implemented method of claim 1, wherein the characterization of the consistency of the one or more data purging activities evaluates whether a frequency of purging activities for at least the given database table is performed within a designed purging interval.

6. The computer-implemented method of claim 1, further comprising assigning at least the given database table to at least one of a plurality of categories based at least in part on (i) the characterization of the consistency of growth of at least the given database table and (ii) the characterization of the consistency of the one or more data purging activities, and wherein the generating the one or more data retention recommendations for at least the given database table comprises obtaining one or more designated data retention recommendations associated with the assigned at least one category.

7. The computer-implemented method of claim 1, further comprising evaluating a data access report to identify one or more of unused data and orphaned data and recommending a purging of the identified one or more of the unused data and the orphaned data.

8. The computer-implemented method of claim 1, wherein the one or more automated actions comprise at least one of: generating one or more notifications related to the one or more data retention recommendations; generating one or more signals related to the one or more data retention recommendations; providing information characterizing the one or more data retention recommendations to a display system; and controlling a performance of at least one action in another system using the one or more data retention recommendations.

9. An apparatus comprising:
at least one processing device comprising a processor coupled to a memory;
the at least one processing device being configured to implement the following steps:
accessing, using at least one processing device, one or more data structures comprising information characterizing changes in size over time of one or more database tables;
predicting, using at least one processor-based regression model, an estimated table size of at least a given one of the one or more database tables;
evaluating one or more data features that characterize an error associated with the prediction of the estimated table size of at least the given database table by the at least one processor-based regression model;
characterizing, using at least one processor-based clustering model, a consistency of a growth of at least the given database table based at least in part on the error associated with the prediction;
characterizing a consistency of one or more data purging activities in at least one database system comprising at least the given database table;
automatically generating, using the at least one processing device, responsive to the consistency of growth characterization, one or more data retention recommendations for at least the given database table based at least in part on (i) the characterization of the consistency of growth of at least the given database table and (ii) the characterization of the consistency of the one or more data purging activities; and
initiating one or more automated actions based at least in part on the one or more data retention recommendations for at least the given database table, wherein the one or more automated actions comprise at least one of: purging unused data associated with at least the given database table, purging obsolete data associated with at least the given database table, adjusting a suitable retention period for at least the given database table, adjusting an automated purging frequency for at least the given database table, adjusting an automated purging interval for at least the given database table and adjusting an automated purging program for at least the given database table.

10. The apparatus of claim 9, wherein the characterization of the consistency of growth of at least the given database table further comprises processing the one or more data features for at least the given database table to cluster at least the given database table into a first cluster associated with consistent table growth or a second cluster associated with inconsistent table growth.

11. The apparatus of claim 9, wherein the characterization of the consistency of the one or more data purging activities evaluates whether a frequency of purging activities for at least the given database table is performed within a designed purging interval.

12. The apparatus of claim 9, further comprising assigning at least the given database table to at least one of a plurality of categories based at least in part on (i) the characterization of the consistency of growth of at least the given database table and (ii) the characterization of the consistency of the one or more data purging activities, and wherein the generating the one or more data retention recommendations for at least the given database table comprises obtaining one or more designated data retention recommendations associated with the assigned at least one category.

13. The apparatus of claim 9, further comprising evaluating a data access report to identify one or more of unused data and orphaned data and recommending a purging of the identified one or more of the unused data and the orphaned data.

14. The apparatus of claim 9, wherein the one or more automated actions comprise at least one of: generating one or more notifications related to the one or more data retention recommendations; generating one or more signals related to the one or more data retention recommendations; providing information characterizing the one or more data retention recommendations to a display system; and controlling a performance of at least one action in another system using the one or more data retention recommendations.

15. A non-transitory processor-readable storage medium having stored therein program code of one or more software programs, wherein the program code when executed by at least one processing device causes the at least one processing device to perform the following steps:
obtaining accessing, using at least one processing device, one or more data structures comprising information characterizing changes in size over time of one or more database tables;

23 predicting, using at least one processor-based regression model, an estimated table size of at least a given one of the one or more database tables;

evaluating one or more data features that characterize an error associated with the prediction of the estimated table size of at least the at least one given database table by the at least one processor-based regression model;

characterizing, using at least one processor-based clustering model, a consistency of a growth of the at least one given database table based at least in part on the error associated with the prediction;

characterizing a consistency of one or more data purging activities in at least one database system comprising the at least one given database table;

automatically generating, using the at least one processing device, responsive to the consistency of growth characterization, one or more data retention recommendations for the at least one given database table based at least in part on (i) the characterization of the consistency of growth of the at least one given database table and (ii) the characterization of the consistency of the one or more data purging activities; and initiating one or more automated actions based at least in part on the one or more data retention recommendations for the at least one given database table, wherein the one or more automated actions comprise at least one of: purging unused data associated with the at least one given database table, purging obsolete data associated with the at least one given database table, adjusting a suitable retention period for the at least one given database table, adjusting an automated purging frequency for the at least one given database table, adjusting an automated purging interval for the at least one given database table and adjusting an automated purging program for the at least one given database table.

16. The non-transitory processor-readable storage medium of claim 15, wherein the one or more data features that characterize the error associated with the prediction comprise at least (i) a first mean average error data feature between an actual size over time of the at least one given database table and an estimated size over time of the at least one given database table and (i) a second mean average error data feature between a merged list of the actual size of the at least one given database table for at least one designated time interval and a merged list of the estimated size of the at least one given database table for the at least one designated time interval.

17. The non-transitory processor-readable storage medium of claim 15, wherein the characterization of the consistency of growth of the at least one given database table further comprises processing the one or more data features for the at least one given database table to cluster the at least one given database table into a first cluster associated with consistent table growth or a second cluster associated with inconsistent table growth.

18. The non-transitory processor-readable storage medium of claim 15, wherein the characterization of the consistency of the one or more data purging activities evaluates whether a frequency of purging activities for the at least one given database table is performed within a designed purging interval.

19. The non-transitory processor-readable storage medium of claim 15, further comprising assigning the at least one given database table to at least one of a plurality of categories based at least in part on (i) the characterization of the consistency of growth of the at least one given database table and (ii) the characterization of the consistency of the one or more data purging activities, and wherein the generating the one or more data retention recommendations for the at least one given database table comprises obtaining one or more designated data retention recommendations associated with the assigned at least one category.

20. The non-transitory processor-readable storage medium of claim 15, further comprising evaluating a data access report to identify one or more of unused data and orphaned data and recommending a purging of the identified one or more of the unused data and the orphaned data.

* * * * *